US012732532B2

(12) United States Patent
Fontaine et al.

(10) Patent No.: US 12,732,532 B2
(45) Date of Patent: Sep. 8, 2026

(54) METHOD FOR DEFENDING AGAINST AN ATTEMPT TO DISCONNECT TWO ENTITIES, AND ASSOCIATED SYSTEM

(71) Applicant: ORANGE, Issy les Moulineaux (FR)

(72) Inventors: Fabrice Fontaine, Chatillon Cedex (FR); David Armand, Chatillon Cedex (FR)

(73) Assignee: ORANGE, Issy les Moulineaux (FR)

( * ) Notice: Subject to any disclaimer, the term of this patent is extended or adjusted under 35 U.S.C. 154(b) by 199 days.

(21) Appl. No.: 18/559,429

(22) PCT Filed: May 9, 2022

(86) PCT No.: PCT/FR2022/050877
§ 371 (c)(1),
(2) Date: Nov. 7, 2023

(87) PCT Pub. No.: WO2022/238644
PCT Pub. Date: Nov. 17, 2022

(65) Prior Publication Data
US 2024/0244076 A1 Jul. 18, 2024

(30) Foreign Application Priority Data
May 10, 2021 (FR) ...................................... 2104907

(51) Int. Cl.
*G06F 21/00* (2013.01)
*H04L 9/40* (2022.01)

(52) U.S. Cl.
CPC ................................ *H04L 63/1441* (2013.01)

(58) Field of Classification Search
CPC ............. H04L 63/1441; H04L 63/1416; H04L 63/1458; H04L 63/1466; H04W 84/12; H04W 12/122
See application file for complete search history.

(56) References Cited

U.S. PATENT DOCUMENTS 7,971,253 B1 6/2011 Gupta
10,771,498 B1 * 9/2020 Tamhane .............. H04W 12/12
(Continued)

FOREIGN PATENT DOCUMENTS

CN 106658484 A 5/2017

OTHER PUBLICATIONS

Ma et al, "Protecting satellite networks from disassociation DoS attacks," 2010 IEEE International Conference on Communication Systems, Singapore, 2010, pp. 662-666, doi: 10.1109/ICCS.2010.5686600. (Year: 2010).*
(Continued)

*Primary Examiner* — Michael M Lee
(74) *Attorney, Agent, or Firm* — David D. Brush; Westman, Champlin & Koehler, P.A.

(57) ABSTRACT

A method for defending against an attempt of disconnection between two entities corresponding to a network access point and a client device. The method includes, after the establishment of an initial connection between the two entities, a set of steps implemented by one or each of the two entities: receiving a set of disconnection requests; evaluating at least one criterion) defined from a metric based on the set of requests or on at least one other disconnection request received after the receipt of the set of requests, so as to allow the detection of a malicious disconnection attempt. The method further includes, if at least one criterion is met for at least one of the two entities, executing, by at least one of the two entities, a process for protecting against the malicious disconnection attempt.

14 Claims, 7 Drawing Sheets

(56) References Cited

U.S. PATENT DOCUMENTS

| | | | | |
|---|---|---|---|---|
| 2005/0025107 | A1* | 2/2005 | Usuba | H04L 12/12 370/340 |
| 2011/0178933 | A1* | 7/2011 | Bailey, Jr. | H04L 63/20 726/1 |
| 2014/0177618 | A1* | 6/2014 | Shen | H04W 76/11 370/338 |
| 2017/0244732 | A1 | 8/2017 | Manjunath et al. | |
| 2019/0149994 | A1* | 5/2019 | Van Antwerp | H04W 12/12 726/4 |

OTHER PUBLICATIONS

English translation of the Written Opinion of the International Searching Authority dated Jul. 8, 2022 for corresponding International Application No. PCT/FR2022/050877, filed May 9, 2022.
International Search Report dated Jul. 8, 2022 for corresponding International Application No. PCT/FR2022/050877, filed May 9, 2022.
Written Opinion of the International Searching Authority dated Jul. 8, 2022 for corresponding International Application No. PCT/FR2022/050877, filed May 9, 2022.
French Search Report and Written Opinion dated Nov. 18, 2021 for corresponding French Application No. 2104907, filed May 10, 2021.

* cited by examiner

[Fig. 1]
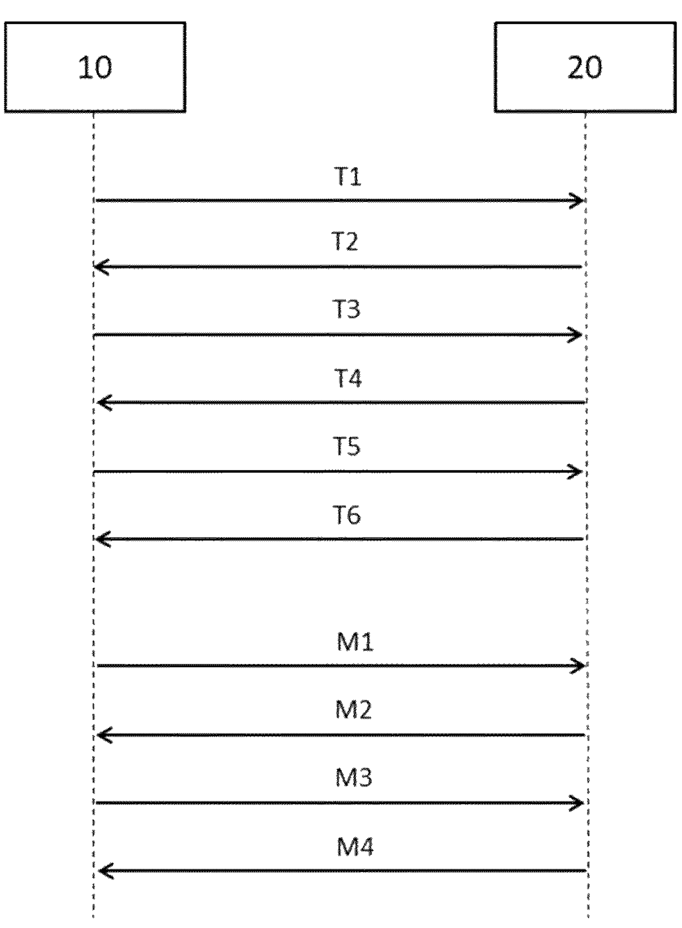
[Fig. 2]
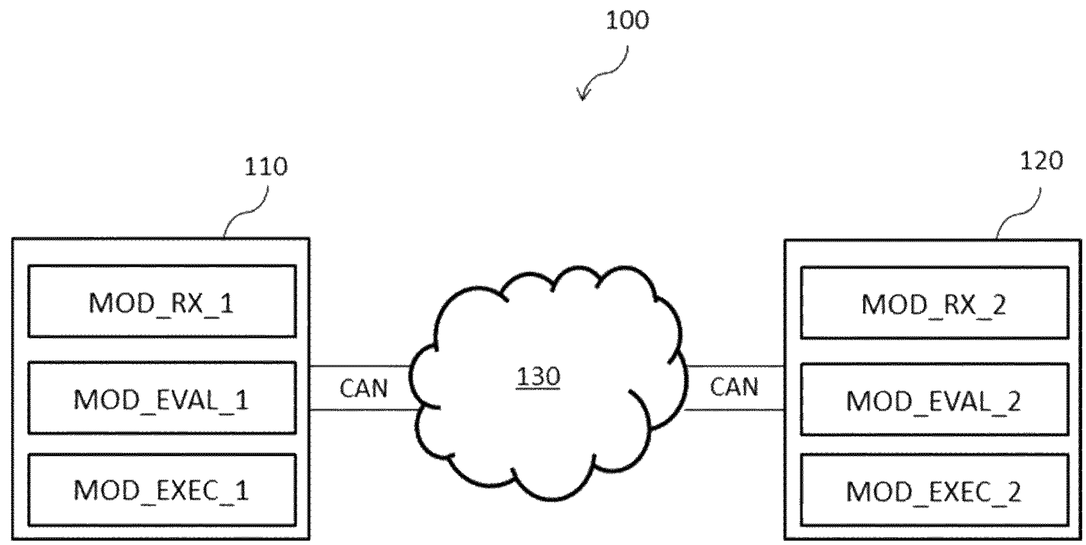

[Fig. 3]
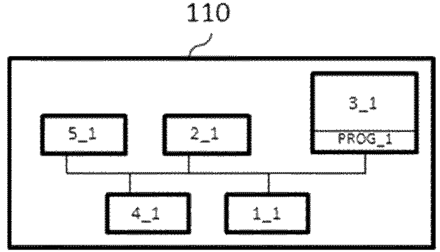
[Fig. 4]
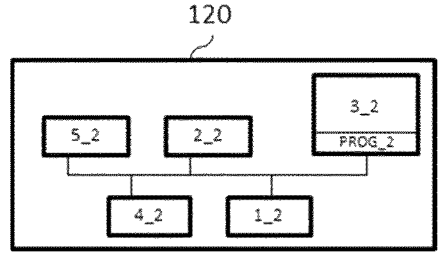
[Fig. 5]
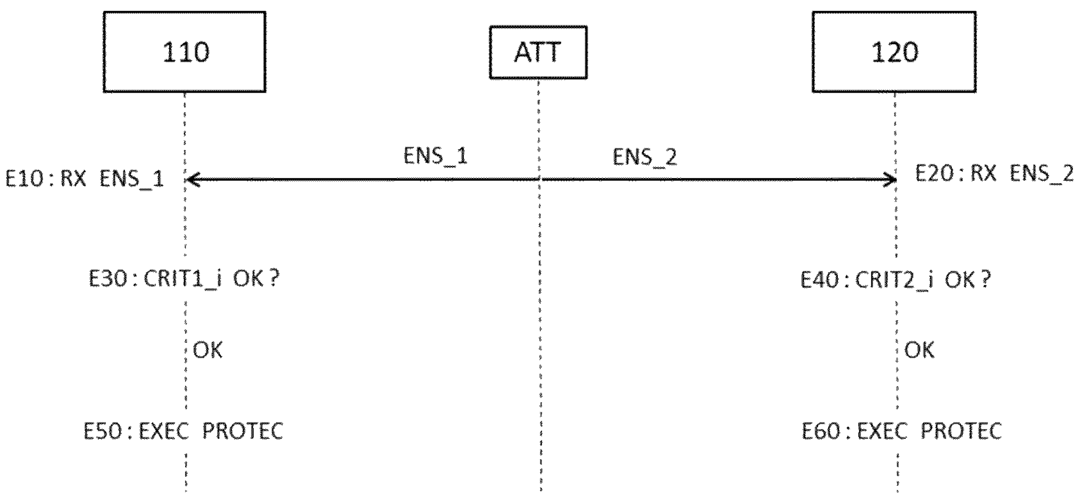

[Fig. 6]
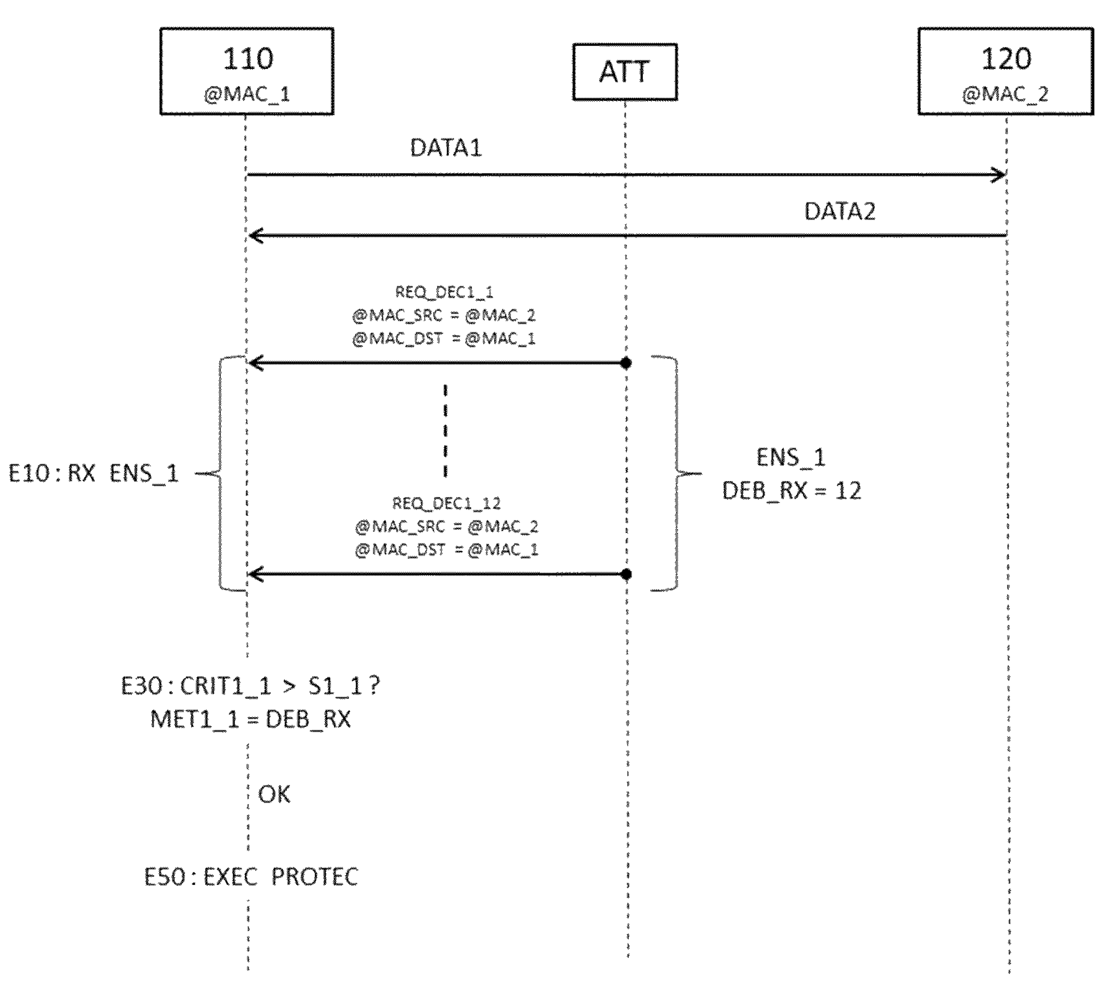

[Fig. 7]
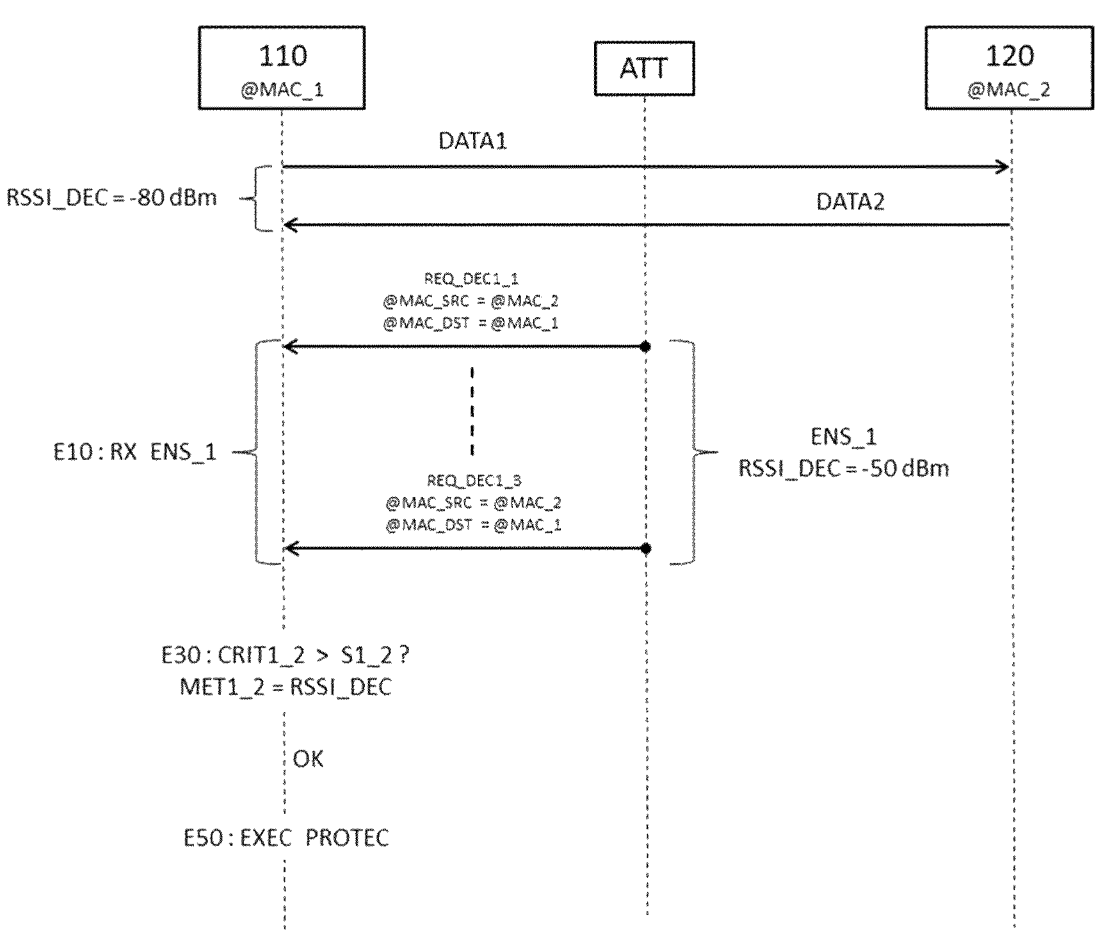

[Fig. 8]
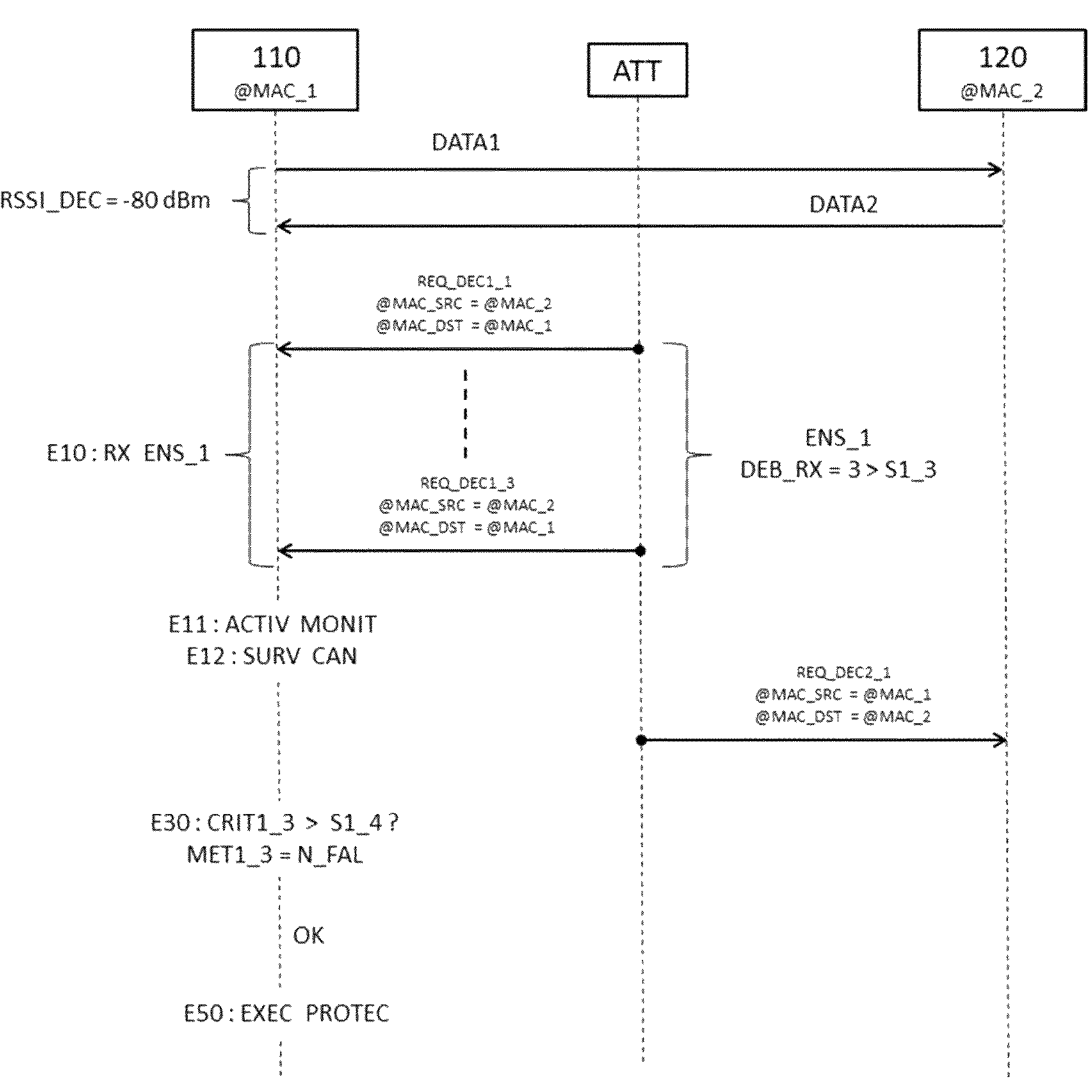

[Fig. 9]
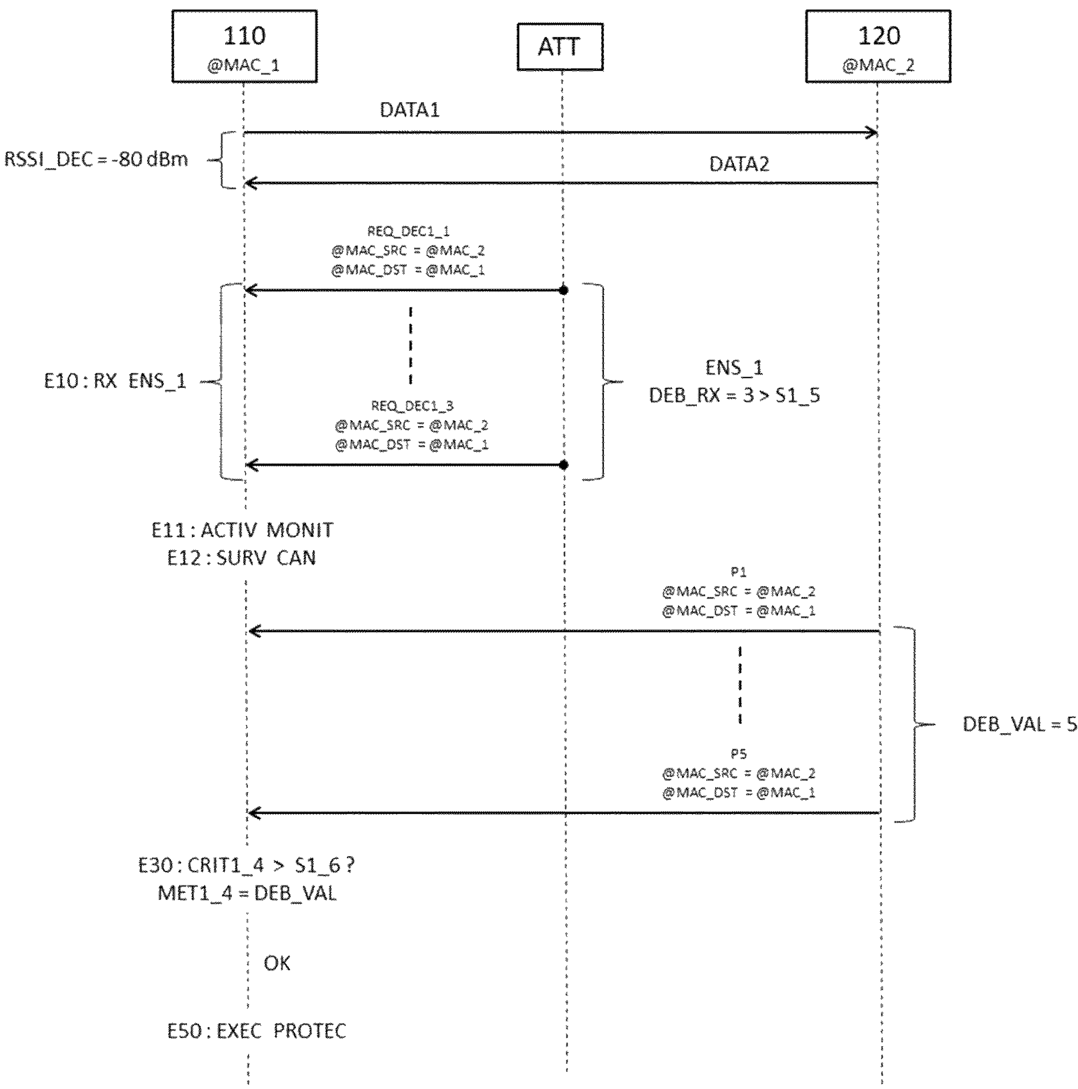

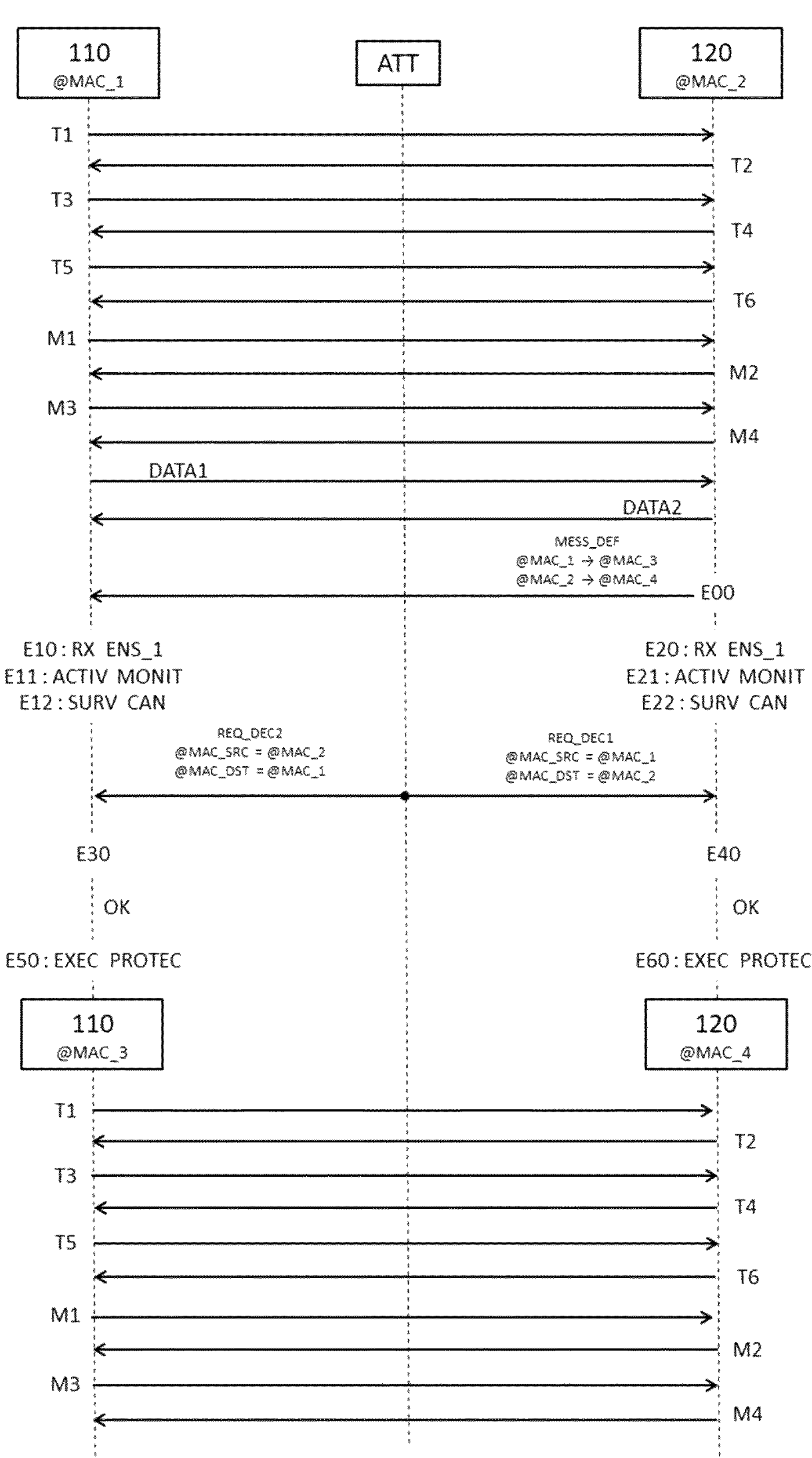
[Fig. 10]

METHOD FOR DEFENDING AGAINST AN ATTEMPT TO DISCONNECT TWO ENTITIES, AND ASSOCIATED SYSTEM

CROSS-REFERENCE TO RELATED APPLICATIONS

This Application is a Section 371 National Stage Application of International Application No. PCT/FR2022/050877, filed May 9, 2022, which is incorporated by reference in its entirety and published as WO 2022/238644 A1 on Nov. 17, 2022, not in English.

PRIOR ART

The present invention belongs to the general field of telecommunications. It relates in particular to a method for defending against an attempt of disconnection between two entities corresponding to a network access point and a client device, as well as a system configured to implement said defense method. The invention finds a particularly advantageous application, although without limitation, in the context of the "Internet of Things" (IoT) for a network access point and a client device able to exchange data therebetween in accordance with a Wi-Fi protocol (registered trademark).

Conventionally, when a client device wishes to connect to a communications network, such as for example a local area network used domestically or within a company, it first seeks to establish a connection with a suitable network access point.

It is noted that the expression "network access point" (or more simply "access point" in the remainder of the description) conventionally refers to equipment configured to contribute to the deployment of said communication network, by offering communication services to one or several client devices equipped with network interfaces and located in the radio coverage area (home, business, etc.) of said access point. It is also noted that an access point can take various forms, depending on the nature of the deployed network. By way of non-limiting example, it may be a router, a network switch, a server, a Wi-Fi internet box, etc.

The connection between a client device and an access point relies on standardized messages exchanged between them. Such messages consist in sending data packets, in the form of frames conforming to a determined communication protocol, and which generally correspond to requests and to responses to these requests.

Thus, and by way of example, FIG. 1 schematically represents messages exchanged within the framework of a connection between a client device 10 corresponding to a user terminal of the laptop computer type and an access point 20 corresponding to a Wi-Fi internet box for domestic use. The protocol used for the transmission of these messages is a Wi-Fi protocol meeting a standard IEEE 802.11 (ISO/CEI 8802-11).

As illustrated in FIG. 1, the messages exchanged to establish the connection between the client device 10 and the access point 20 successively include in this order:

- a frame T1 emitted by the client device 10 and corresponding to a query request ("PROBE REQUEST"), as well as a frame T2 emitted by the access point 20, upon receipt of the frame T1, and corresponding to a response to said query request ("PROBE RESPONSE"). Said frames T1 and T2 define a phase of discovery of the connection capabilities of the client device 10 and of the access point 20;
- a frame T3 emitted by the client device 10 and corresponding to an authentication request ("AUTHENTICATION REQUEST"), as well as a frame T4 emitted by the access point 20, upon receipt of the frame T3, and corresponding to a response to said authentication request ("AUTHENTICATION RESPONSE"). Said frames T3 and T4 define an authentication phase making it possible to validate that the client device 10 is able to connect to the access point 20;
- a frame T5 emitted by the client device 10 and corresponding to an association request ("ASSOCIATION REQUEST"), as well as a frame T6 emitted by the access point 20, upon receipt of said frame T5, and corresponding to a response to said association request ("ASSOCIATION RESPONSE"). Said frames T5 and T6 define an effective association phase between the client device 10 and the access point 20.

Ultimately, the transmission of the frames T1 to T6 forms a method, called "connection method", allowing the establishment of a connection (i.e. a point-to-point link) between the client device 10 and the access point 20. It is noted that following the frame T6, additional standardized messages M1, M2, M3 and M4 are still transmitted between the client device 10 and the access point 20, so as to exchange session keys allowing them to encrypt their subsequent exchanges. This session key exchange corresponds to a procedure called "4-way handshake" procedure.

Of course, once said connection is established, it can be broken. This can be done in a legitimate context where the client device 10 transmits to the access point 20 (respectively the access point 20 transmits to the client device 10) a frame corresponding to a disconnection request ("DEAUTHENTICATION REQUEST").

This can also be done in an illegitimate context where a third party entity, distinct from the client device 10 and from the access point 20, usurps for example the identity of the access point 20 to transmit to the client device 10 one or several disconnection requests (the opposite example, in which the usurped identity is that of the client device 10, can of course also be envisaged). In other words, the client device 10 and/or the access point 20 can each be subject, from said third party entity, to a malicious disconnection attempt.

Such an attack (malicious disconnection attempt) is further facilitated by the fact that, within the framework of the Wi-Fi protocols meeting IEEE 802.11 (ISO/IEC 8802-11) standards prior to 2009, the disconnection requests have no protection to guarantee the legitimacy of the entity(ies) emitting them.

In order to correct this technical deficiency, solutions have been proposed. Particularly, it was proposed to supplement the standards of the IEEE 802.11 group with an amendment noted 802.11w-2009. The latter provides a solution called "PMF" (acronym for "Protected Management Frame"), making it possible to encrypt and authenticate, and therefore a fortiori secure, the data contained in frames called "management" frames, which form part of said frames T1 to T6 as well as the disconnection requests.

This PMF solution nevertheless remains little deployed to this day, due in particular to a particularly complex and restrictive technical implementation since it requires modifying the firmware integrated into the Wi-Fi network card(s) of each of the entities intended to be connected together, in this case the client device 10 and the access point 20. Furthermore, even if an entity is configured in a suitable manner, the PMF solution is not necessarily activated by this entity. Indeed, the activation may lead to a modification of some parameter values in the messages sent by the entity in question (e.g. PROBE RESPONSE frame sent by the access point 20). Such a modification may cause problems of interoperability with clients who are not implementing the PMF solution.

Ultimately, and to this day, there is no solution for defending against the disconnection attempts that is both effective and simple to implement. This is problematic insofar as this type of attack generates inconvenience, particularly a service outage, but can also be the source of more unfortunate consequences such as for example the theft of personal data if a Wi-Fi key is transmitted in clear during a re-pairing following a malicious disconnection. It is further understood that this problem is all the more significant in the current context of the IoT where each everyday object is intended to become a communicating object.

Furthermore, although having been described until now by considering the sole example of a Wi-Fi protocol, this problem can also be envisaged when using other protocols, such as for example a proprietary protocol presenting similar shortcomings (lack of authentication of the disconnection requests, complex and restrictive implementation of a security solution).

DISCLOSURE OF THE INVENTION

The present invention aims to overcome all or part of the drawbacks of the prior art, in particular those set out above, by proposing a solution that makes it possible to provide an effective and simple-to-implement protection against the malicious disconnection attempts that may affect an access point and/or a client device.

It is noted that the terms "effective protection" refer here to a protection provided not only in the case where disconnection requests are not protected (authenticated), but also in the opposite case where said disconnection requests are a priori protected, given that a risk of attack, making this protection obsolete, can never be completely excluded.

For this purpose, and according to a first aspect, the invention relates to a method for defending against an attempt of disconnection between two entities corresponding to a network access point and a client device, said method including, after the establishment of an initial connection between said two entities to exchange data on a communication channel in accordance with a determined communication protocol, a set of steps implemented by one or each of said two entities, said set of steps comprising:

- a receipt of a set of disconnection requests,
- an evaluation of at least one criterion defined from a metric based on said set of requests or on at least one other disconnection request received after the receipt of said set of requests, so as to allow the detection of a malicious disconnection attempt.

Said method further includes, if at least one criterion is met for at least one of said two entities, a step of executing, by at least one of said two entities, a process for protecting against said malicious disconnection attempt, so as to maintain a connection between said two entities.

Thus, in its general principle, the defense method according to the invention initially includes an analysis phase (evaluation of at least one criterion) executed by at least one of said two entities (client device, access point) receiving one or several disconnection requests. In this way, if disconnection requests are received from a third party entity making an attack (malicious disconnection attempt), the analysis phase makes it possible to detect the illegitimate nature of said requests, and therefore in fine the attack made by the attacker. Of course, conversely, if an analysis phase carried out by an entity does not conclude the detection of a malicious disconnection attempt, then the connection between the two entities is legitimately broken.

Furthermore, in the case where at least one of the two entities was able to detect an attack, the defense method according to the invention includes another phase corresponding to the implementation of a process for protecting against said attack. Said protection process aims to allow maintaining a connection between the client device and the access point so that they can continue to communicate with each other, even possibly in a degraded manner.

"Degraded", refers here for example to a communication made late, this delay coming from the time that it was necessary to allocate in order to detect a malicious disconnection attempt.

Furthermore, "maintaining a connection between the client device and the access point", refers either to maintaining the initial connection, or to maintaining a connection made subsequently to said initial connection, following for example a voluntary disconnection of at least one of said two entities. Such a voluntary disconnection is for example triggered following the activation, by at least one of said two entities, of a monitor mode, as described in more detail below with reference to particular modes of implementation of the invention.

In other words, the fact of executing a protection process after an attack has been detected can be seen as the implementation of a backup plan making it possible to circumvent said attack.

Such an implementation (first phase to detect an attack, then second phase to protect against this attack) is particularly advantageous in that it can be implemented in a simpler manner than the solutions of the prior art. Indeed, the defense method according to the invention can be implemented at the application level (i.e. in a processor executing steps of the defense method and fitted to an entity). In other words, it is not necessary to modify the firmware of the communication card(s) (such as Wi-Fi cards) fitted to the client device and/or the access point. Consequently, the solution proposed by the invention offers the possibility of easily deploying an effective protection against malicious disconnection attempts.

It is also understood that the ease of software implementation of the solution proposed by the invention also has a positive impact in terms of cost in comparison with the solutions of the prior art.

In particular modes of implementation, the defense method can further include one or several of the following characteristics, taken separately or in all technically possible combinations.

In particular modes of implementation, a metric corresponds to the rate of receipt of the requests belonging to the set of requests received by an entity, the criterion associated with said metric being met if said receiving rate is greater than a given threshold.

In particular modes of implementation, a metric corresponds to the power level in receipt of the requests belonging to the set of requests received by an entity, called "disconnection level", the criterion associated with said metric being met if the gap between said disconnection level and the power level in receipt of valid data frames received by said entity prior to the receipt of said set of requests is, in absolute value and for a determined duration, greater than a given threshold.

In particular modes of implementation, said method further includes, when the rate of receipt of the requests belonging to the set of requests received by one of said two entities, called "first entity", has reached a first given threshold, steps implemented by said first entity and comprising:

- an activation of a monitor mode,
- a monitoring of the network traffic on said communication channel, so as to be able to detect at least one disconnection request, called "falsified request", issued by a source usurping the identity of said first identity and intended for the other of said two entities, called "second entity".

In addition, in these particular modes of implementation, a metric corresponds to the number or to the rate of falsified requests detected by said first entity, the criterion associated with said metric being met if said number or said rate is greater than a second given threshold.

In a manner known per se, by activating said monitor mode (other names may still be encountered, such as for example: Radio Frequency Monitoring, RF Monitor, rfmon, RFMON, Air Monitor, Network Monitor, NetMon, or even RF monitoring), an entity equipped with a suitable network card (for example a Wi-Fi network card) is able to listen to (to sniff) the Wi-Fi traffic on the channel of its choosing, including that of the communication network to which it was attached before the activation of said monitor mode.

In particular modes of implementation, a metric corresponds to the number of falsified requests detected by said first entity, the criterion associated with said metric being met if said number is greater than or equal to 1.

In particular modes of implementation, said method further includes, when the rate of receipt of the requests belonging to the set of requests received by one of said two entities, called "first entity", has reached a first given threshold, steps implemented by said first entity and comprising:

- an activation of a monitor mode,
- a monitoring of the network traffic on said communication channel, so as to be able to detect at least one valid data packet emitted by the other of said two entities, called "second entity", and intended for said first entity, In addition, in these particular modes of implementation, a metric corresponds to the rate of valid data packets detected by said first entity, the criterion associated with said metric being met if said rate is greater than a second given threshold.

In particular modes of implementation, a protection process executed by an entity includes a modification of at least one communication parameter used by one of said two entities to transmit data after the establishment of said initial connection.

The fact of modifying at least one communication parameter corresponds to a defense strategy making it possible to circumvent the ongoing attack, rather than seeking to make a frontal opposition to this attack. In this sense, such a strategy is more an "escape" and/or a "camouflage" behavior with regard to the ongoing attack, than a counter-attack behavior. Consequently, the point here is not to try to identify the attacker, but rather to get away from him, while trying to maintain a connection.

In particular modes of implementation, a protection process is executed by the client device, a modified parameter corresponding to a unique identifier of said client device.

In particular modes of implementation, a protection process is executed by the access point, at least one modified parameter corresponding:

- to a unique identifier of said access point, and/or
- to the communication channel associated with said initial connection, and/or
- to an identifier of the communications network, and/or
- to a temporal data contained in frames emitted by said access point, and/or
- to an emitting power from said access point, and/or
- to a hopping frequency.

It is noted that the fact of modifying, on the access point side, a unique identifier (such as for example a hardware address) and/or the communication channel corresponds to a preferred implementation insofar as this makes it possible to increase the security of the existing connection (or of a future connection where appropriate) between the access point and the client device.

These advantages are further enhanced when a unique identifier of the client device is also modified.

In particular modes of implementation, each of said two entities executes a protection process including a role reversal, so that the access point is configured as a client device, and so that the client device is configured as an access point.

In particular modes of implementation:

- if at least one criterion is met for only one entity, a protection process is executed by said entity and consists in ignoring the received disconnection request(s), or
- if at least one criterion is met for each of said two entities, a protection process is executed by each of said two entities and consists in ignoring the received disconnection request(s).

In particular modes of implementation, the execution of a protection process is iterated.

These iterations can for example be performed periodically within the same communication session. The fact of iterating a protection process (for example by regularly modifying at least one communication parameter and/or by regularly carrying out a role reversal) makes it possible to consolidate the defense that can be implemented, and in fine improve the security of the connection between the client device and the access point.

In particular modes of implementation:

- a protection process executed by an entity is stored by said entity prior to the implementation of said defense method, and/or
- for one of said two entities, called "second entity", executing a protection process, said defense method includes a step of transmitting a message from the other of said two entities, called "first entity", to said second entity, said message including said protection process, said transmission being implemented following the establishment of the initial connection and in an encrypted manner.

In particular modes of implementation, the communication protocol is a Wi-Fi protocol.

According to a second aspect, the invention relates to a computer program including instructions for the implementation of receiving, evaluation and execution steps of a defense method according to the invention when said computer program is executed by a computer.

This program can use any programming language, and be in the form of source code, object code, or intermediate code between source code and object code, such as in a partially compiled form, or in any other desirable form.

According to a third aspect, the invention relates to an information or recording medium readable by a computer on which a computer program according to the invention is recorded.

The information or recording medium can be any entity or device capable of storing the program. For example, the medium can include a storage means such as a ROM for example a CD ROM or a microelectronic circuit ROM, or a magnetic recording means for example a floppy disk or a hard disk.

On the other hand, the information or recording medium can be a transmissible medium such as an electrical or optical signal, which can be conveyed via an electrical or optical cable, by radio or by other means. The program according to the invention can be particularly downloaded onto an Internet type network.

Alternatively, the information or recording medium can be an integrated circuit in which the program is incorporated, the circuit being adapted to execute or to be used in the execution of the method in question.

According to a fourth aspect, the invention relates to a network access point able to be connected to a client device to exchange data on a communication channel in accordance with a determined communication protocol, said access point including:

- a receiving module configured to receive, after a connection has been established between said access point and the client device, a set of disconnection requests,
- an evaluation module configured to evaluate at least one criterion defined from a metric based on said set of requests or on at least one other disconnection request received after the receipt of said set of requests, so as to allow the detection of a malicious disconnection attempt.

According to a fifth aspect, the invention relates to a client device able to be connected to a network access point to exchange data on a communication channel in accordance with a determined communication protocol, said client device including:

- a receiving module configured to receive, after a connection has been established between said access point and the client device, a set of disconnection requests,
- an evaluation module configured to evaluate at least one criterion defined from a metric based on said set of requests or on at least one other disconnection request received after the receipt of said set of requests, so as to allow the detection of a malicious disconnection attempt.

According to a sixth aspect, the invention relates to a system for defending against an attempt of disconnection between two entities corresponding to a network access point and a client device, said entities being able to be connected to each other to exchange data on a communication channel in accordance with a determined communication protocol, and in which:

- said access point conforms to the invention and/or said client device conforms to the invention,
- at least one of said two entities includes an execution module configured to execute, if at least one criterion is met for at least one of said two entities, a process for protecting against said malicious disconnection attempt, so as to maintain a connection between the access point and the client device.

BRIEF DESCRIPTION OF THE DRAWINGS

Other characteristics and advantages of the present invention will emerge from the description given below, with reference to the appended drawings which illustrate one exemplary embodiment devoid of any limitation. In the figures:

FIG. 1 schematically represents a connection method, in accordance with the state of the art, between a client device and an access point, said connection method including exchanges of messages according to a Wi-Fi protocol;

FIG. 2 schematically represents, in its environment, one particular embodiment of a defense system according to the invention;

FIG. 3 schematically represents one example of hardware architecture of a client device belonging to the defense system of FIG. 2;

FIG. 4 schematically represents one example of hardware architecture of an access point belonging to the defense system of FIG. 2;

FIG. 5 represents, in flowchart form, the main steps of a defense method according to the invention as they are implemented by the defense system of FIG. 2;

FIG. 6 schematically represents a first particular mode of implementation of the method of FIG. 5;

FIG. 7 schematically represents a second particular mode of implementation of the method of FIG. 5;

FIG. 8 schematically represents a third particular mode of implementation of the method of FIG. 5;

FIG. 9 schematically represents a fourth particular mode of implementation of the method of FIG. 5;

FIG. 10 schematically represents a fifth particular mode of implementation of the method of FIG. 5.

DESCRIPTION OF THE EMBODIMENTS

FIG. 2 schematically represents, in its environment, one particular embodiment of a system 100 according to the invention.

For this purpose, and as illustrated in FIG. 2, the system 100 includes two entities, namely a client device 110 and a network access point 120.

For the remainder of the description, it is considered without limitation that the client device 10 is a mobile terminal owned by a user, such as for example a smart phone, a digital tablet, a laptop computer, etc. It is also considered that the access point 120 is a network gateway making it possible to connect a local communication network for private domestic use 130 (network of the "LAN" type, acronym for "Local Area Network") to the public Internet network (network of the "WAN" type, acronym for "Wide Area Network", not represented in FIG. 2). It is noted that said access point 120 is still known under the name "Internet box".

It is also considered for the remainder of the description that the data (messages) exchanged between the client device 110 and the access point 120, via a communication channel CAN of the local area network 130 deployed by the access point 120, are in the form of packets encapsulated in frames (for example requests and responses to these requests). Said frames conform to a Wi-Fi protocol meeting an IEEE 802.11 standard (ISO/IEC 8802-11). Finally, it is further considered that none of said two entities 110, 120 is configured in software and hardware in order to implement a PMF protection.

It should however be noted that the fact of considering that the client device 110 and the access point 120 correspond respectively to a mobile terminal and an Internet box constitutes only one choice of implementation of the invention. Generally, no limitation is attached to the respective natures of said client device 110 (fixed terminal for example, such as a desktop PC) and of said access point 120 (dedicated server for example).

It is also noted that the fact of considering an access point 120 offering connectivity to remote servers (example: public Internet network, as mentioned above) constitutes only one variant of implementation of the invention. The invention does not exclude envisaging other modes in which the client device 110 is only intended to communicate with the access point 120 via the local area network 130 deployed by the latter, i.e. without seeking to be connected with a other network that may be placed behind the access point 120 (example: a drone plays the role of Wi-Fi access point so that a mobile phone can connect to it in order to drive it, all communications remaining between these two entities alone, the drone offering no connectivity with remote servers).

Furthermore, nothing excludes envisaging a communication protocol other than a Wi-Fi protocol, such as for example a proprietary protocol. The invention also does not exclude that the communication protocol is based on a wired technology (optical fiber, Ethernet cable, KNX bus, etc.).

Finally, it is also important to note that the example in FIG. 2 is given purely for illustrative purposes and that the number of access points as well as the number of client devices that may belong to the system 100 are not limiting factors of the invention.

Conventionally, the client device 110 and the access point 120 are configured so as to be able to carry out processing operations allowing them to establish a connection between them, by implementing a connection method such as the one described with reference to FIG. 1 (transmission of the frames T1 to T6).

For this purpose, the client device 110 includes for example one or several processors and storage means (magnetic hard disk, electronic memory, optical disk, etc.) in which data and a computer program are stored, in the form of a set of program code instructions to be executed to implement a first set of steps (emission of the frames T1, T3, T5, and receipt of the frames T2, T4, T6) of said connection method.

Alternatively or complementarily, the client device 110 also includes one or several programmable logic circuits, of the FPGA, PLD, etc. type, and/or specialized integrated circuits (ASIC), and/or a set of discrete electronic components, etc. adapted to implement said first set of steps of the connection method.

In other words, the client device 110 includes a set of means configured in software (specific computer program) and/or hardware (FPGA, PLD, ASIC, etc.) to implement said first set of steps of the connection method.

Similarly, the access point 120 includes for example one or several processors and storage means (magnetic hard disk, electronic memory, optical disk, etc.) in which data and a computer program are stored, in the form of a set of program code instructions to be executed to implement a second set of steps (emission of the frames T2, T4, T6, and receipt of the frames T1, T3, T5) of said connection method.

Alternatively or complementarily, the access point 120 also includes one or several programmable logic circuits, of the FPGA, PLD, etc. type, and/or specialized integrated circuits (ASIC), and/or a set of discrete electronic components, etc. adapted to implement said second set of steps of the connection method.

In other words, the access point 120 includes a set of means configured in software (specific computer program) and/or in hardware (FPGA, PLD, ASIC, etc.) to implement said second set of steps of the connection method.

In accordance with the invention, the system 100 is further configured to carry out processing operations making it possible to provide, once the client device 110 and the access point 120 are connected together, a defense against an attack consisting of a malicious disconnection attempt, by implementing a defense method according to the invention. Such defense particularly aims to maintain a connection between the client device 110 and the access point 120 so that they can continue to communicate with each other.

It is noted that "malicious disconnection attempt" generally refers to an attack targeting the client device 110 and/or the access point 120. In other words, the client device 110 and the access point 120 can each receive one or several illegitimate disconnection requests (i.e. issued by an unauthenticated third party entity at the origin of the attack in question).

For the remainder of the description, it is considered without limitation that the client device 110 and the access point 120 both contribute to the defense method, and are respectively configured in a suitable manner to implement steps of said defense method. In this way, the client device 110 (respectively the access point 120) can carry out processing operations making it possible to maintain a connection with the access point 120 (respectively with the client device 110).

However, nothing excludes envisaging other embodiments in which only one entity among the client device 110 and the access point 120 participates in the processing operations subject to the defense method. In this case, it is understood that the expression "malicious disconnection attempt" more specifically refers to an attack targeting the entity which implements steps of the defense method.

FIG. 3 schematically represents an example of hardware architecture of the client device 110 belonging to the system 100 of FIG. 2.

As illustrated in FIG. 3, the client device 110 has the hardware architecture of a computer. Thus, the client device 110 includes, in particular, a processor 1_1, a random access memory 2_1, a read only memory 3_1 and a non-volatile memory 4_1. It also includes a communication module 5_1.

The read only memory 3_1 of the client device 110 constitutes a recording medium in accordance with the invention, readable by the processor 1_1 and on which a computer program PROG_1 in accordance with the invention is recorded, including instructions for the execution of steps of the defense method according to the invention. The program PROG_1 defines functional modules of the client device 110, which rely on or control the hardware elements 1_1 to 5_1 of the client device 110 cited above, and which comprise in particular:

- a receiving module MOD_RX_1 configured to receive, after a connection has been established between the access point 120 and the client device 110 (in accordance with the connection method mentioned above), a set of disconnection requests,
- an evaluation module MOD_EVAL_1 configured to evaluate at least one criterion defined from a metric based on said set of requests or on at least one other disconnection request received after the receipt of said set of requests, so as to allow the detection of a malicious disconnection attempt,
- an execution module MOD_EXEC_1 configured to execute, if at least one criterion is met for said client device 110, a process for protecting against said malicious disconnection attempt, so as to maintain a connection between the access point 120 and the client device 110.

It should be noted that generally, in the present description, a "set of disconnection requests" can include one or several disconnection requests.

The communication module 5_1 in particular allows the client device 110 to communicate with the access point 120, and therefore integrates the means configured in hardware and/or in software described above to implement said first set of steps (emission of the frames T1, T3, T5, and receipt of the frames T2, T4, T6) of the connection method. The communication module 5_1 also allows the client device 110 to communicate with entities of the local area network other than the access point 120, and integrates in particular for this purpose said receiving module MOD_RX_1 (the disconnection request(s) received may be illegitimate, and therefore transmitted by a third party entity).

The access point 120 has a hardware architecture similar to that of the client device 110.

FIG. 4 schematically represents an example of hardware architecture of the access point 120 belonging to the system 100 of FIG. 2.

As illustrated in FIG. 4, the access point 120 has the hardware architecture of a computer. Thus, the access point 120 includes, in particular, a processor 1_2, a random access memory 2_2, a read only memory 3_2 and a non-volatile memory 4_2. It further includes a communication module 5_2.

The read only memory 3_2 of the access point 120 constitutes a recording medium in accordance with the invention, readable by the processor 1_2 and on which a computer program PROG_2 in accordance with the invention is recorded, including instructions for the execution of steps of the defense method according to the invention. The program PROG_2 defines functional modules of the access point 120, which rely on or control the hardware elements 1_2 to 5_2 of the access point 120 mentioned above, and which comprise in particular:

- a receiving module MOD_RX_2 configured to receive, after a connection has been established between the access point 120 and the client device 110 (in accordance with the connection method mentioned above), a set of disconnection requests,
- an evaluation module MOD_EVAL_2 configured to evaluate at least one criterion defined from a metric based on said set of requests or on at least one other disconnection request received after receipt of said set of requests, so as to allow the detection of a malicious disconnection attempt,
- an execution module MOD_EXEC_2 configured to execute, if at least one criterion is met for said access point 120, a process for protecting against said malicious disconnection attempt, so as to maintain a connection between the access point 120 and the client device 110.

The communication module 5_2 in particular allows the access point 120 to communicate with the client device 110, and therefore integrates the means configured in hardware and/or in software described above to implement said second set of steps (emission of the frames T2, T4, T6, and receipt of the frames T1, T3, T5) of the connection method. The communication module 5_2 also allows the access point 120 to communicate with entities of the local area network other than the client device 110, and integrates in particular for this purpose said receiving module MOD_RX_2 (the disconnection request(s) received may be illegitimate, and therefore transmitted by a third party entity).

A general implementation of the defense method, as executed by the system 100 of FIG. 2 will now be described. Particular modes of implementation are described later. It should be noted that said defense method is implemented after the establishment of a connection between the client device 110 and the access point 120. In other words, the implementation of the connection method precedes that of the defense method, and it is now considered that the client device 110 and the access point 120 are connected to each other via a connection called “initial” connection, so as to be able to exchange data on the communication channel CAN in accordance with a Wi-Fi protocol mentioned above.

FIG. 5 represents, in flowchart form, the main steps of the defense method according to the invention as they are implemented by the system 100 of FIG. 2.

In its general principle, the defense method includes, initially, an analysis phase executed by at least one of the two entities 110, 120 receiving one or several disconnection requests (it being understood that only one of said two entities 110, 120 or said two entities 110, 120 can receive disconnection requests). In this way, if disconnection requests are received from a third party entity making an attack (malicious disconnection attempt), and hereinafter referred to as “attacker ATT” (without said requests, and therefore a fortiori the attacker ATT itself, being authenticated), the analysis phase executed by an entity 110, 120 makes it possible to detect the illegitimate nature of said requests, and therefore in fine the attack made by the attacker ATT. It is of course understood that, conversely, if an analysis phase carried out by an entity 110, 120 does not conclude the detection of a malicious disconnection attempt, then the connection between the two entities 110, 120 is broken legitimately (the client device 110 can of course reconnect subsequently to the access point 120, except in the case where it has been placed on an exclusion list by the latter).

Moreover, in the case where at least one of the two entities 110, 120 of the system 100 was able to detect an attack made by the attacker ATT, the method includes another phase executed by said at least one entity of the system 100 and which corresponds to the implementation of a process for protecting against said attack. Said protection process aims to maintain a connection between the client device 110 and the access point 120, so that they can continue to communicate with each other, even possibly in a degraded manner. “Degraded”, refers here for example to a communication carried out late, this delay coming from the time it was necessary to allocate in order to detect a malicious disconnection attempt.

For the remainder of the description of the defense method in FIG. 5, it is considered without limitation that an attacker ATT carries out a malicious disconnection attempt which targets the two entities 110, 120 of the system 100. For this purpose, the attacker ATT transmits to the client device 110 (respectively to the access point 120) a set ENS_1 of disconnection requests (respectively a set ENS_2 of disconnection requests).

Therefore, and as illustrated in FIG. 5, the defense method includes a step E10 of receiving, by the client device 110, the set ENS_1. Said step E10 is implemented by the receiving module MOD_RX_1 fitted to the client device 110.

The defense method also includes a step E20 of receiving, by the access point 120, the set ENS_2. Said step E20 is implemented by the receiving module MOD_RX_2 fitted to the access point 120.

It is noted that in the defense method of FIG. 5, steps E10 and E20 are implemented in parallel, which is due to the fact that the sets ENS_1 and ENS_2 are assumed to be emitted simultaneously by the attacker ATT. It should however be noted that nothing excludes envisaging asynchronous receipts of said sets ENS_1 and ENS_2 (for example consecutive receipts) on the assumption that the attacker ATT does not emit said sets ENS_1 and ENS_2 simultaneously.

The defense method also includes a step E30 of evaluating, by the client device 110, at least one criterion CRIT1_*i* (i being an integer index greater than or equal to 1) defined from a metric MET1_*i* based on said set of requests ENS_1 or on at least one other disconnection request received after the receipt of said set of requests ENS_1, so as to allow the detection of a malicious disconnection attempt. Said step E30 is implemented by the evaluation module MOD_EVAL_1 fitted to the client device 110.

Similarly to step E30, the defense method also includes a step E40 of evaluating, by the access point 120, at least one criterion CRIT2_*j* (j being an integer index greater than or equal to 1) defined from a metric MET2*j* based on said set of requests ENS_2 or on at least one other disconnection request received after the receipt of said set of requests ENS_2, so as to allow the detection of a malicious disconnection attempt. Said step E40 is implemented by the evaluation module MOD_EVAL_2 fitted to the access point 120.

It should be noted that, within the framework of the present invention, the number of metrics that can be envisaged both in step E30 and in step E40 is greater than or equal to 1. It is therefore understood that two criteria respectively associated with two distinct metrics necessarily differ from each other.

It can also be noted that the invention does not exclude the fact of envisaging criteria relying on the same metric, but nevertheless distinct from each other (distinct threshold values).

Furthermore, the metric(s) used for the implementation of step E30 may be entirely or partially distinct from the metric(s) used for the implementation of step E40.

For the description of the defense method in FIG. 5, it is assumed that, once said steps E30 and E40 have been executed, at least one criterion CRIT1_*i* is met for the client device 110, but also that at least one criterion CRIT2_*j* is met for the access point 120.

Therefore, and as illustrated in FIG. 5, the defense method includes a step E50 of executing, by the client device 110, a process for protecting against the malicious disconnection attempt which targets it as well as the access point 120, so as to maintain a connection between said two entities 110, 120. Said step E50 is implemented by the execution module MOD_EXEX_1 fitted to the client device 110.

Similarly to step E50, the defense method includes a step E60 of executing, by the access point 120, a process for protecting against the disconnection attempt which targets it as well as the client device 110, again with the objective of maintaining a connection between said two entities 110, 120. Said step E60 is implemented by the execution module MOD_EXEX_2 fitted to the access point 120.

It is important to note that the protection processes respectively executed by the client device 110 and the access point 120 may differ from each other. These aspects are described in more detail later.

Particular modes of implementation of the defense method of FIG. 5 are now described. More particularly, and initially, particular modes of implementation are described in which distinct metrics are used during the execution of steps E30 and E40 (FIGS. 6, 7, 8 and 9).

As mentioned above, the metric(s) used for the implementation of step E30 may be entirely or partially distinct from the metric(s) used for the implementation of step E40. In any case, a metric applicable to one of the two entities 110, 120 of the system 100 can also be applied, following entirely similar technical arrangements, to the other of said two entities 110, 120. For this reason, and so as to simplify the description, the particular modes described below, to detail examples of metrics, only concern step E30, it being understood that these modes can be envisaged in an equivalent manner (i.e. by reversing the respective roles of the client device 110 and of the access point 120) with regard to step E40.

FIG. 6 schematically represents a first particular mode of implementation of the method of FIG. 5.

In said first mode, step E30 is executed by using a metric MET1_1 corresponding to the rate of receipt DEB_RX of the requests belonging to the set of requests ENS_1 received by the client device 110. The criterion CRIT1_1 associated with said metric MET1_1 is for its part met if said receiving rate DEB_RX is greater than a given threshold S1_1.

As a non-limiting example, and as illustrated in FIG. 6, disconnection requests REQ_DEC1_*k* (k being an integer index), forming said set ENS_1, are received continuously (i.e. on a continuous-flow basis) by the client device 110, after an exchange of data with the access point 120 (this data exchange is symbolized by arrows bearing the references DATA1 and DATA2).

Each disconnection request REQ_DEC1_*k* has:

- for source address MAC_SRC (i.e. coming from said request REQ_DEC1_*k*), an address corresponding to a unique identifier of the access point 120, namely in this example the hardware address MAC_2 ("MAC" being the acronym for "Media Access Control") of said access point 120,
- for destination address MAC_DST, an address corresponding to a unique identifier of the client device 110, namely in this example the hardware address MAC_1 of said client device 110.

It is important to note that the disconnection requests REQ_DEC1_*k* have as real origin the attacker ATT, and that they are therefore indeed illegitimate requests since they usurp the identity of the access point 120.

In the example of FIG. 6, the rate of receipt DEB_RX of said disconnection requests is equal to twelve requests per second, even though the threshold S1_1 associated with the criterion CRIT1_1 is set at ten disconnection requests per second.

Also, after one second of receipt of disconnection requests, twelve disconnection requests REQ_DEC1_1, . . . , REQ_DEC1_12 are received by the client device 110. Consequently, the threshold S1_1 is exceeded, and the criterion CRIT1_1 is therefore met, so that a malicious disconnection attempt is detected (in this case, the client device 110 detects that it is attacked).

Of course, the fact of considering a threshold S1_1 equal to ten disconnection requests per second constitutes only one example of implementation of said first mode of implementation. Generally, no limitation is attached to the value of said threshold S1_1.

FIG. 7 schematically represents a second particular mode of implementation of the method of FIG. 5.

It is noted that the similar elements between FIGS. 6 and 7 use the same notation formality.

In said second mode, step E30 is executed by using a metric MET1_2 corresponding to the power level in receipt of the requests belonging to the set of requests ENS_1 received by the client device 110, called "disconnection level". In the example of FIG. 7, said disconnection level corresponds to a level of "RSSI" type (acronym for "Received Signal Strength Indication"), noted below RSSI_DEC.

The criterion CRIT1_2 associated with said metric MET1_2 is for its part met if the gap between said disconnection level RSSI and the power level RSSI_RX in receipt of valid data frames (data "DATA2" in FIG. 7) received by said client device 110 prior to the receipt of said set ENS_1 is, in absolute value and for a determined duration, greater than a given threshold S1_2.

In the example of FIG. 7, the disconnection level RSSI_DEC is equal to −50 dBm for a duration of 1 second (three requests REQ_DEC1_1, REQ_DEC1_2 and REQ_DEC1_3 are received by the client device 110 for 1 second, and each of these requests is associated with a disconnection level RSSI_DEC is equal to −50 dBm). In comparison, the power level RSSI_RX in receipt prior to the receipt of said disconnection requests is equal to −80 dBm. The gap between the levels RSSI_DEC and RSSI_RX, in absolute value and for 1 second, is therefore equal to 30, even though the threshold S1_2 associated with the criterion CRIT1_2 is set at 10 dBm per second.

Consequently, the threshold S1_2 is exceeded, and the criterion CRIT1_2 is therefore met, so that a malicious disconnection attempt is detected (in this case, the client device 110 detects that it is attacked).

Of course, the fact of considering a threshold S1_2 equal to 10 dBm per second constitutes only one example of implementation of said second mode of implementation. Generally, no limitation is attached to the value of said threshold S1_2.

FIG. 8 schematically represents a third particular mode of implementation of the method of FIG. 5.

It is noted that the similar elements between FIGS. 6 and 8 use the same notation formality.

In said third mode, the defense method further includes, when the rate of receipt DEB_RX of the requests belonging to the set of requests ENS_1 received by the client device 110 has reached a first given threshold S1_3 (said receiving rate DEB_RX is here evaluated during the receiving step E10), steps implemented by said client device 110 and comprising:

- an activation (step E11) of a monitor mode. Once configured in said monitor mode, the client device 110 is able to listen to (to sniff) the traffic of the local area network 130. It is noted that the fact of activating said monitor mode, from the client device 110, de facto causes the (voluntary) disconnection of the client device 110, the access point 120 being informed of this disconnection (of course, if the client device 110 is equipped with several Wi-Fi network cards, the switching to monitor mode refers to the disconnection of the Wi-Fi card hereinto used to allow it to communicate with the access point 120, following the initial connection). All the technical aspects related to the activation of such a monitor mode, as well as to the capabilities of the client device 110 once configured in this monitor mode, are well known to those skilled in the art and are therefore not described in further detail here,
- a monitoring (step E12) of the network traffic on said communication channel CAN, so as to be able to detect at least one disconnection request, called "falsified request", issued by a source usurping the identity of the client device 110 and intended for the access point 120.

Furthermore, in said third mode, step E30 is executed by using a metric MET1_3 corresponding to the number N_FAL of falsified requests detected by the client device 110 (they are requests usurping the identity of the client device 110, intended for the access point 120 and detected after the switching to monitor mode). The criterion CRIT1_3 associated with said metric MET1_3 is for its part met if said number N_FAL is greater than a second given threshold S1_4.

In the example of FIG. 8, the first threshold S1_3 is equal to two disconnection requests per second. Also, and as illustrated in FIG. 8, three requests REQ_DEC1_1, REQ_DEC1_2 and REQ_DEC1_3 are received by the client device 110 for 1 second (DEB_RX=3), so that, upon receipt of said third request REQ_DEC1_3, the client device 110 switches to monitor mode and monitors the network traffic. During this monitoring, it detects a disconnection request REQ_DEC2_1 intended for the access point 120 and usurping the identity of said client device 110 (N_FALS=1), even though the threshold S1_4 associated with the criterion CRIT1_3 is set at 0.

Consequently, the threshold S1_3 is exceeded, and the criterion CRIT1_3 is therefore met, so that a malicious disconnection attempt is detected (in this case, the client device 110 detects that the access point 120 is attacked).

Of course, the fact of considering a first threshold S1_3 (respectively a second threshold S1_4) equal to two disconnection requests per second (respectively equal to 0) constitutes only one example of implementation of said third mode of implementation. Generally, no limitation is attached to the value of said first threshold S1_3 (respectively to the value of said second threshold S1_4).

Moreover, the implementation of said third mode is also not limited by the fact of considering a metric corresponding to the number of falsified requests detected by the client device 110. Nothing indeed excludes considering another metric, such as for example a metric corresponding to the rate of receipt of falsified requests detected by the client device 110, the threshold taken into account for the criterion associated with this other metric being for example equal to ten falsified requests detected in 1 second.

It is also noted that insofar as the client device 110 is here disconnected from the access point 120 (due to the switching to monitor mode), it is appropriate to envisage a reconnection to said access point 120 for said client device 110 given that an objective of the defense method is to maintain a connection between these two entities. Such a reconnection can be envisaged during the execution of the protection process (step E50) if the latter consists for example in ignoring the disconnection requests received, or at the end of said protection process if the latter consists for example in a modification of at least one communication parameter used by one of said two entities 110, 120 to transmit data after the establishment of the initial connection. Such examples of protection process are described in more detail later. In any case, the reconnection mechanism as such is known to those skilled in the art (waiting for the receipt of a beacon frame, a "4-way handshake" procedure, etc.).

FIG. 9 schematically represents a fourth particular mode of implementation of the method of FIG. 5.

It is noted that the similar elements between FIGS. 6 and 9 use the same notation formality.

In said fourth mode, the defense method further includes, when the rate of receipt DEB_RX of the requests belonging to the set of requests ENS_1 received by the client device 110 has reached a first given threshold S1_5 (said receiving rate DEB_RX is here evaluated during the receiving step E10), steps implemented by said client device 110 and comprising:

- an activation (step E11) of a monitor mode,
- a monitoring (step E12) of the network traffic on said communication channel CAN, so as to be able to detect at least one valid data packet emitted by the access point 120, and intended for the client device 110.

Furthermore, in said fourth mode, step E30 is executed by using a metric MET1_4 corresponding to the rate DEB_VAL of valid data packets detected by the client device 110. The criterion CRIT1_4 associated with said metric MET1_4 is for its part met if said rate DEB_VAL is greater than a second given threshold S1_6.

In the example of FIG. 9, the first threshold S1_5 is equal to two disconnection requests per second. Also, and as illustrated in FIG. 9, three requests REQ_DEC1_1, REQ_DEC1_2 and REQ_DEC1_3 are received by the client device 110 for 1 second (DEB_RX=3), so that, upon receipt of said third request REQ_DEC1_3, the client device 110 switches to monitor mode and monitors the network traffic. During this monitoring, the client device 110 detects that the access point 120 sends it five valid data packets P1, P2, P3 P4, P5 in one second (DEB_VAL=5), even though the threshold S1_6 associated with the criterion CRIT1_4 is set at three valid data packets per second.

Consequently, the threshold S1_6 is exceeded, and the criterion CRI1_4 is therefore met, so that a malicious disconnection attempt is detected.

Of course, the fact of considering a first threshold S1_5 (respectively a second threshold S1_6) equal to two disconnection requests per second (respectively equal to three valid packets) constitutes only one exemplary implementation of said fourth mode of implementation. Generally, no limitation is attached to the value of said first threshold S1_5 (respectively to the value of said second threshold S1_6).

It is moreover noted that such a fourth mode of implementation finds a preferred (but not exclusive) application when the client device 110 is equipped with a plurality of network cards (in this case, it is here Wi-Fi cards, as for example in the case of a Wi-Fi repeater), it being understood that the activation of the monitor mode is performed by disconnecting the Wi-Fi card hereinto used to allow the latter to communicate with the access point 120, following the initial connection.

Said first, second, third and fourth modes of implementation have been described separately and assuming that the detection of a malicious disconnection attempt is performed by the client device 110 (this attempt being able to target the client device 110 itself or the access point 120).

That being said, and as already mentioned previously, these modes apply just as much (by role reversal) to the access point 120, so that the latter is able to detect a malicious disconnection attempt (this attempt being able to target the access point 120 itself or even the client device 110).

Furthermore, whatever the entity 110, 120 of the system 100 considered, all or part of said first, second, third and fourth modes of implementation can be executed according to any technically possible combination. Thus, if N modes (N comprised between 1 and 4) among said first, second, third and fourth modes are combined with each other for an entity 110, 120, an attack can be detected by said entity 110, 120 if M criteria (M comprised between 1 and N) are met.

Still other particular modes of implementation of the defense method of FIG. 5 will now be described. More particularly, particular modes of implementation of steps E50 and E60 are described allowing the execution, by each of the entities 110, 120 of the system 100, a process for protecting against the attack made by the attacker ATT.

It should be noted that the modes which are now described in relation to steps E50 and E60 can be combined (according to all technically possible combinations) with all the modes previously described with reference to FIGS. 6, 7, 8 and 9 (first, second, third and fourth modes).

FIG. 10 schematically represents a fifth particular mode of implementation of the method of FIG. 5.

It is noted that the similar elements between FIG. 10 and any one of FIGS. 6, 7, 8 and 9 use the same notation formality.

In said fifth mode of implementation, it is first observed, following the implementation of the connection procedure (frames T1 to T6), so as to establish the initial connection, as well as the implementation of the "4-way handshake" procedure, that the access point 120 transmits to the client device 110 a message MESS_DEF (step E00 of the defense method in said fifth mode of implementation).

Said message MESS_DEF is preferably transmitted in an encrypted manner and includes the protection process that each of the entities 110, 120 is intended to apply in case a malicious disconnection attempt targeting at least one of said two entities 110, 120 is detected.

In said fifth mode of implementation, the message MESS_DEF allows the access point 120 to inform the client device 110 that, in case of detection of an attack, each entity 110, 120 must modify a communication parameter used by said entity 110, 120 to transmit data after the establishment of the initial connection. More particularly, the access point 120 here modifies its hardware address MAC_2 into MAC_4 and the client device 110 must modify its hardware address MAC_1 into MAC_3. In other words, each of the two entities 110, 120 of the system 100 modifies its hardware address.

It should be noted that the message MESS_DEF, and therefore a fortiori the protection processes it contains, were here stored by said access point 120 prior to the implementation of the defense method. This storage is for example performed in the non-volatile memory 42 of the access point 120, during the design and manufacture of the latter.

Alternatively, said message MESS_DEF transmitted by the access point 120 to the client device 110 can correspond to a standardized message registered in the standard on which the communication protocol used by said two entities 110, 120 is based. In this case, only the client device 110 stores the protection process transmitted thereto during the implementation of the defense method, given that it is the access point 120 that is at the origin of this standardized transmission.

In said fifth mode of implementation, each of the two entities 110, 120 is targeted by a disconnection attempt detected following an implementation conforming to said third mode (FIG. 8) and in which the metric taken into account is the number of falsified requests detected by each of the two entities 110, 120. It is further considered that a criterion common to said two entities 110, 120 is associated with said metric, this criterion being met if said number of falsified requests detected is greater than or equal to 1.

Also, and as illustrated in FIG. 10:

- the client device 110 implements receiving E10, monitor mode activation E11 and monitoring E12 steps,
- the access point 120 implements receiving E20, monitor mode activation E21 (similar to step E11) and monitoring E22 (similar to step E12) steps.

In addition, each entity 110, 120 detects a falsified request:

- the client device 110 detects a request REC_DEC1 usurping the identity of said client device 110 and addressed to the access point 120, the access point 120 detects a request REC_DEC2 usurping the identity of said access point 120 and addressed to the client device.

Consequently, each entity 110, 120 detects an attack and therefore executes the protection process associated therewith, that is to say a change of hardware address.

Ultimately, and as illustrated in FIG. 10, a new connection procedure is implemented following the execution of said protection processes, this new connection procedure relying on the new hardware addresses now used (it is recalled that to detect falsified requests, each entity 110, 120 here switches to monitor mode and consequently disconnects from the other entity 110, 120). A connection is therefore maintained between the client device 110 and the access point 120, it being understood it this is a connection subsequent to said initial connection.

The fifth mode of implementation of FIG. 10 has been described by considering that the communication parameter modified by the access point 120, when it executes the protection process dedicated to it, corresponds to its initial hardware address MAC_2 (modification of MAC_2 into MAC_4). The defense method is however not limited to such a modification. By way of non-limiting example, a communication parameter modified by the access point 120 can correspond to any one of the communication parameters among:

- a unique identifier of said access point 120, such as for example the hardware address MAC_2 of the latter, an identifier of the BSSID (Basic Service Set Identifier) type, an identifier of the ESSID (Extended Service Set Identifier) type, etc.; and/or
- the communication channel CAN associated with said initial connection. For example, in the case of a Wi-Fi local area network using the 2.4 GHz frequency band, there are thirteen usable channels, the channel CAN forming part of said thirteen channels; and/or
- an identifier of the communication network, such as for example an identifier of the SSID (Service Set Identifier) type; and/or
- a temporal data contained in frames emitted by said access point 120, such as for example an indication of availability (uptime) contained in a header referring to a timestamp of the BSS (Basic Service Cet) type; and/or
- an emitting power from said access point 120, and/or
- a hopping frequency of the FH (Frequency Hopping) type.

Nothing excludes envisaging, following other examples not detailed here, still other communication parameters likely to be modified within the framework of the protection process executed by the access point 120 (serial number, model name, etc.).

In addition, no limitation is attached to the number of communication parameters that can be modified by the access point 120 during the same execution of the protection process, particularly among those cited above. Preferably, a unique identifier and/or the communication channel CAN are modified as a priority, because this makes it possible to increase the security of the existing connection (or of a future connection where appropriate) between the access point 120 and the client device 110. It is noted that these arrangements are further combined with the fact that the hardware address of the client device 110 can also be modified within the framework of the execution of the protection process dedicated to said client device 110.

The fifth mode of implementation of FIG. 10 has also been described by considering that the emitter of the message MESS_DEF is the access point 120. Of course, it is also possible to envisage that this emitter role is played by the client device 110.

It should also be noted that the implementation of two protection processes, respectively by the access point 120 and the client device 110, constitutes only one variant of implementation of the invention. Thus, nothing excludes envisaging modes in which only one of said two entities 110, 120 executes a protection process. Moreover, it is possible to envisage the execution of a protection process by only one of the two entities 110, 120:

- when a malicious disconnection attempt targets the two entities 110, 120, or
- when a malicious disconnection attempt targets only one of said two entities 110, 120, it being understood that the single entity 110, 120 executing a protection process may or may not correspond to the single entity attacked.

For example, if the client device 110 is the only one attacked and detects this attack, it can itself execute a protection process, this protection process having for example been transmitted by the access point 120 via a message similar to the message MESS_DEF mentioned above. These arrangements can be symmetrically transposed to the case where the access point 120 is the only one attacked, detects this attack, and executes a protection process transmitted by the client device 110.

Alternatively, if the client device 110 is the only one attacked and detects this attack, a protection process can be executed by the access point 120 after the client device 110 has notified said access point 120, for example by means of a suitable alert message. It is understood, in this alternative, that the hardware architecture of the client device 110 differs from the one described above with reference to FIG. 3, and that the client device 110 therefore includes a receiving module, an evaluation module and no execution module (or an execution module that remains inactive here). On the other hand, the access point 120 for its part includes an execution module configured to execute, upon receipt of said alert message, the protection process associated therewith. Here again, these arrangements can be transposed to the case where the access point 120 is the only one attacked, detects this attack, and the client device 110 executes a protection process after having been notified by the access point 120.

In summary, within the meaning of the present invention, what is most important is that at least one of said two entities 110, 120 (ideally both entities 110, 120) is able to detect a malicious disconnection attempt which targets it, and that, following a detection of an attack, at least one of said two entities 110, 120 is able to execute a protection process, so as to maintain a connection between said two entities 110, 120.

It should be noted that still other modes of implementation of the defense method (not illustrated in the figures) can be envisaged, in particular in terms of execution of protection process. Such other modes can be combined (in all technically possible combinations) with the modes described so far.

Thus, in another particular mode of implementation, each of said two entities 110, 120 executes a protection process (it being understood that said two entities 110, 120 are attacked or only one of said two entities is attacked), and each protection process executed by an entity 110, 120 includes a role reversal with the other entity 110, 120. In this way, the access point 120 is configured as (i.e. plays a role of) a client device, and the client device 110 is configured as (i.e. plays the role of) an access point.

According to yet another mode of implementation, if at least one criterion is met for the client device 110 only (respectively the access point 120 only), a protection process is executed by said client device 110 (respectively by said access point 120) and consists in ignoring the disconnection request(s) received. Otherwise, in this mode, the client device 110 (respectively the access point 120) does not modify any communication parameters, so as to be able to continue to communicate "normally" with the access point 120 (respectively with the client device 110). "Normally" refers to the fact that the detected attack is ignored.

According to yet another particular mode of implementation, if at least one criterion is met for each of said two entities 110, 120, a protection process is executed by each of said two entities 110, 120 and consists in ignoring the disconnection request(s) received. This mode therefore relies on bases similar to those mentioned in the previous mode, with the difference that this time the two entities 110, 120 of the system 100 are attacked and both ignore the disconnection requests they receive.

Still other variants remain possible, such as for example maintaining several connections between the client device 110 and the access point 120 once an attack has been detected, so as to increase the difficulty of carrying out an attack for the attacker ATT, or once the client device 110 and/or the access point emit deliberately erroneous frames so as to disorient the attacker ATT.

It is also noted that the invention has been described so far by considering that when a protection process is executed by an entity 110, 120, this execution only takes place once. The invention is however not limited by such arrangements. To this end, it is possible to envisage that the execution of a protection process is iterated, for example periodically within the same communication session. The fact of iterating a protection process (for example by regularly modifying at least one communication parameter and/or by regularly carrying out a role reversal) makes it possible to consolidate the defense that can be implemented by the system 100, and in fine improve the security of the connection between the client device 110 and the access point 120.

Finally, the invention has also been described until now by considering that none of said two entities 110, 120 is configured in software and in hardware to implement a PMF protection. In this way, the solution proposed by the invention is particularly simple to implement, the firmware of the Wi-Fi cards fitted to the two entities 110, 120 not requiring modification. The invention nevertheless remains applicable, at the cost of a more complex technical implementation, in cases where at least one entity 110, 120 of the system 100 can implement a PMF protection (it being understood that an entity able to implement a PMF protection cannot activate it if the other entity is not able to manage this PMF protection).

The invention claimed is:

1. A method for defending against an attempt of disconnection between first and second entities corresponding to a network access point and a client device, said method comprising:

after establishment of an initial connection between the first and second entities to exchange data on a communication channel in accordance with a determined communication protocol, a set of steps implemented by one or each of the first or second entities, said set of steps comprising:

transmitting, from one of the first or second entity to the other of the second or first entity, an encrypted message containing a protection process to be executed in case of a malicious disconnection attempt;

receiving a set of disconnection requests, and evaluating at least one criterion defined from a metric based on said set of disconnection requests or on at least one other disconnection request received after the receipt of said set of disconnection requests, the at least one criterion indicating whether a malicious disconnection attempt is detected, and in response to the at least one criterion being met for at least one of the first or second entity, executing, by at least one of the first or second entity, the protection process transmitted previously in the encrypted message for protecting against said malicious disconnection attempt to maintain the connection between the first and second entities.

2. The method of claim 1, wherein the metric corresponds to a rate of receipt of the disconnection requests belonging to the set of disconnection requests received by the first or second entity, the criterion associated with said metric being met if said receiving rate is greater than a given threshold.

3. The method of claim 1, wherein the metric corresponds to a power level in receipt of the disconnection requests belonging to the set of disconnection requests received by the first or second entity, called "disconnection level", the criterion associated with said metric being met if a gap between said disconnection level and the power level in receipt of valid data frames received by said entity prior to the receipt of said set of disconnection requests is, in absolute value and for a determined duration, greater than a given threshold.

4. The method of claim 1, said method further including, when a rate of receipt of the disconnection requests belonging to the set of disconnection requests received by one of the first entity, has reached a first given threshold, steps implemented by said first entity and comprising:

activating a monitor mode, monitoring network traffic on said communication channel to detect at least one disconnection request, called "falsified request", issued by a source usurping an identity of said first entity and intended for the second entity, and wherein a metric corresponds to a number or to a rate of falsified requests detected by said first entity, the criterion associated with said metric being met if said number or said rate is greater than a second given threshold.

5. The method of claim 1, said method further including, when a rate of receipt of the disconnection requests belonging to the set of disconnection requests received by the first entity, has reached a first given threshold, steps implemented by said first entity and comprising:

activating a monitor mode, monitoring network traffic on said communication channel, to detect at least one valid data packet emitted by the second entity, and intended for said first entity, and wherein a metric corresponds to a rate of valid data packets detected by said first entity, the criterion associated with said metric being met if said rate is greater than a second given threshold.

6. The method of claim 1, wherein the protection process executed by the first and/or second entity includes a modification of at least one communication parameter used by one of said first or second entity to transmit data after the establishment of said initial connection.

7. The method according to claim 6, wherein the protection process is executed by the client device and the modified at least one communication parameter corresponds to a unique identifier of said client device.

8. The method of claim 6, wherein the protection process is executed by the access point and the modified at least one communication parameter corresponds:
  to a unique identifier of said access point, and/or
  to the communication channel associated with said initial connection, and/or
  to an identifier of the communications network, and/or
  to a temporal data contained in frames emitted by said access point, and/or
  to an emitting power from said access point, and/or
  to a hopping frequency.

9. The method of claim 1, wherein each of the first and second entities executes a protection process including a role reversal, so that the access point is configured as a client device, and so that the client device is configured as an access point.

10. The method of claim 1, wherein:
  in response to at least one criterion being met for only one entity, the protection process is executed by said entity and comprises ignoring the received disconnection request(s), or
  in response to at least one criterion being met for each of said two entities, the protection process is executed by each of first and second entities and includes ignoring the received disconnection request(s).

11. The method of claim 1, wherein the execution of the protection process is iterated.

12. A non-transitory computer-readable medium comprising a computer program stored thereon, comprising instructions which when said program is executed by a processor of a first entity, configure the first entity to:
  transmit, to a second entity, an encrypted message including a protection process to be executed in case of a malicious disconnection attempt;
  receive, after a connection has been established between said first and second entities, a set of disconnection requests;
  evaluate at least one criterion defined from a metric based on said set of disconnection requests or on at least one other disconnection request received after the receipt of said set of disconnection requests, the at least one criterion indicating whether a malicious disconnection attempt is detected; and
  execute, in response to the at least one criterion being met, the protection process transmitted previously in the encrypted message to maintain the connection between the first and second entities.

13. A first entity, able to be connected to a second entity to exchange data on a communication channel in accordance with a determined communication protocol, said first entity comprising:
  a receiver configured to receive, after a connection has been established between said first and second entities, a set of disconnection requests,
  at least one processor; and
  at least one non-transitory computer readable medium comprising instructions stored thereon which when executed by the at least one processor configure the first entity to:
    transmit, to the second entity, an encrypted message including a protection process to be executed in case of a malicious disconnection attempt;
    evaluate at least one criterion defined from a metric based on said set of disconnection requests or on at least one other disconnection request received after the receipt of said set of disconnection requests, the at least one criterion indicating whether a malicious disconnection attempt is detected; and
    in response to the at least one criterion being met, execute the protection process transmitted previously in the encrypted message to maintain a connection between the first and second entities.

14. A system for defending against an attempt of disconnection between first and second entities corresponding to a network access point and a client device, wherein the system comprises:
  said first and second entities, which are able to be connected to each other to exchange data on a communication channel in accordance with a determined communication protocol, and
  wherein each of first and second entities includes:
    at least one processor; and
    at least one non-transitory computer readable medium comprising instructions stored thereon which are executable by the at least one processor;
  wherein the instructions of at least one of the first or second entity configure the at least one first or second entity to:
    transmit, to the other first or second entity, an encrypted message including a protection process to be executed in case of a malicious disconnection attempt;
    receive, after a connection has been established between said first and second entities, a set of disconnection requests, and
    evaluate at least one criterion defined from a metric based on said set of disconnection requests or on at least one other disconnection request received after the receipt of said set of disconnection requests, the at least one criterion indicating whether a malicious disconnection attempt is detected, and
  wherein the instructions of at least one of the first or second entity configure the at least one first or second entity to:
    execute, in response to at least one criterion being met for at least one of said first or second entity, the protection process transmitted previously in the encrypted message to maintain the connection between the access point and the client device.

* * * * *